(12) United States Patent
Kreiner et al.

(10) Patent No.: US 6,900,731 B2
(45) Date of Patent: May 31, 2005

(54) METHOD FOR MONITORING AND TRACKING OBJECTS

(75) Inventors: Barrett Kreiner, Norcross, GA (US);
Donna Hodges, Cumming, GA (US);
Jonathan Peterson, Atlanta, GA (US);
Andre Jarboe, Acworth, GA (US);
Monique Simmons, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 72 days.

(21) Appl. No.: 10/283,099

(22) Filed: Oct. 30, 2002

(65) Prior Publication Data

US 2004/0085207 A1 May 6, 2004

(51) Int. Cl.⁷ .............................................. G08B 13/14
(52) U.S. Cl. ...................... 340/572.1; 235/385; 705/28
(58) Field of Search ........................ 340/572.1, 539.13, 340/825.49, 10.1, 5.92; 235/375, 385; 705/22, 28

(56) References Cited

U.S. PATENT DOCUMENTS

| | | | |
|---|---|---|---|
| 3,689,885 A | 9/1972 | Kaplan et al. ............... | 340/152 |
| 3,732,465 A | 5/1973 | Palmer ....................... | 317/134 |
| 3,752,960 A | 8/1973 | Walton ..................... | 235/61.11 |
| 3,859,624 A | 1/1975 | Kriofsky et al. ............. | 340/38 |
| 4,262,632 A | 4/1981 | Hanton et al. ................ | 119/1 |
| 4,361,153 A | 11/1982 | Slocum et al. ............... | 128/419 |
| 4,532,932 A | 8/1985 | Batty, Jr. .................... | 128/631 |
| 5,012,236 A | 4/1991 | Troyk et al. ........... | 340/825.54 |
| 5,537,126 A | 7/1996 | Kayser et al. | |
| 5,742,237 A * | 4/1998 | Bledsoe ................ | 340/825.49 |
| 5,923,300 A | 7/1999 | Mejia .......................... | 343/788 |
| 5,951,399 A | 9/1999 | Burrell et al. ................. | 463/46 |
| 5,952,935 A | 9/1999 | Mejia et al. ........... | 340/825.54 |
| 6,094,676 A | 7/2000 | Gray et al. .................. | 709/217 |
| 6,095,915 A | 8/2000 | Geissler et al. ............. | 452/198 |
| 6,184,777 B1 | 2/2001 | Mejia ......................... | 340/10.1 |
| D440,505 S | 4/2001 | Laverick ...................... | D10/65 |
| 6,219,710 B1 | 4/2001 | Gray et al. .................. | 709/227 |

(Continued)

FOREIGN PATENT DOCUMENTS

| | | | | |
|---|---|---|---|---|
| EP | 0 258 415 B1 | 12/1992 | ......... | A01K/29/00 |
| WO | WO 87/04900 | 8/1987 | .......... | A01K/29/00 |

OTHER PUBLICATIONS

U.S. to Weigh Computer Chip Implant [online], [retrieved Feb. 27, 2002], 4pp., Retrieved from Internet: http://dailynews.netscape.com/mynsnews/story.tmpl?table=n&cat=51180&id=200202261956000188605.

Digital dog tags: Would you wear one? [online], [retrieved Feb. 11, 2002], 2pp., Retrieved from Internet: http://news.com.com/2100–1001–833379.html.

(Continued)

*Primary Examiner*—Thomas Mullen
(74) *Attorney, Agent, or Firm*—Bambi F. Walters, Esq.; Walters and Zimmerman (57) ABSTRACT

The present invention relates to methods of tracking and monitoring objects in accordance with pre-selected and stored policies that are generated by the owner of the object. These policies define the parameters for determining when an object is lost, for reporting a lost object, and for searching for a lost object. When combined with a network tracking system, the policies can also set parameters for permissible areas in which the objects can be disposed and for tracking of the objects across the network.

9 Claims, 4 Drawing Sheets

U.S. PATENT DOCUMENTS

| | | | | |
|---|---|---|---|---|
| 6,304,642 | B1 | 10/2001 | Beamish et al. | 379/142.01 |
| 6,400,338 | B1 | 6/2002 | Mejia et al. | 343/873 |
| 6,404,339 | B1 | 6/2002 | Eberhardt | |
| 6,705,522 | B2 * | 3/2004 | Gershman et al. | 235/385 |
| 6,738,628 | B1 * | 5/2004 | McCall et al. | 455/456.1 |
| 2001/0030625 | A1 * | 10/2001 | Doles et al. | 342/387 |
| 2002/0119770 | A1 * | 8/2002 | Twitchell, Jr. | 455/422 |
| 2002/0147650 | A1 * | 10/2002 | Kaufman et al. | 705/22 |
| 2003/0014332 | A1 * | 1/2003 | Gramling | 705/28 |
| 2003/0229559 | A1 * | 12/2003 | Panttaja et al. | 705/36 |
| 2003/0235172 | A1 * | 12/2003 | Wood | 370/338 |

OTHER PUBLICATIONS

Introduction to Auto–ID [online], [retrieved Feb. 11, 2002], 1 pp. Retrieved from Internet: http://www.autoidcenter.org/technology.asp.

Transmitting ePC Codes [online], [retrieved Feb. 11, 2002], 1 pp. Retrieved from Internet: http://www.autoidcenter.org/technology_transmitting.asp.

Applications [online], [retrieved Feb. 11, 2002], 1 pp. Retrieved from Internet: http://www.autoidcenter.org/technology_applications.asp.

Reinventing the Supply Chain [online], [retrieved Feb. 11, 2002], 1 pp. Retrieved from Internet: http://www.autoidcenter.org/technology_reinventing.asp.

Summary [online], [retrieved Feb. 11, 2002], 1 pp. Retrieved from Internet: http://www.autoidcenter.org/technology_summary.asp.

GPS–Integrated FRS/GMRS Radios online, [retrieved Jul. 8, 2002], 2 pp., Retrieved from Internet: http://www.garmin.com/products/rino/.

* cited by examiner

METHOD FOR MONITORING AND TRACKING OBJECTS

TECHNICAL AREA

The present invention relates methods for tracking and locating objects.

BACKGROUND

Products and methods have been proposed and developed in an attempt to facilitate locating lost or misplaced items such as remote controls for televisions and stereos, keys, and glasses. Similarly, locating and tracking technologies have been applied to packages for shipment tracking and in object theft prevention. These technologies include complex optical scanning systems, magnetic coding, microwave systems having transmitters and receivers, infrared systems, line-of-sight type systems, mechanical systems requiring physical contact with the object to be sensed and mechanically coded interactive systems of keys in combination with the parts inside a lock.

These systems are used, for example, to locate a lost television remote in a room by causing the television remote to emit an audible signal that can be heard in the room. Typically, such locator systems use a reverse line of sight arrangement to locate the remote. Wireless telephone handsets that have been removed from a cradle can be located in a house by paging the handset to produce an audible signal that can be heard by the person looking for the handset. Both of these locator systems are specific to the objects being located and merely produce an audible signal to announce the location of the misplaced device. The object must be within the range of the locator, i.e. television or phone cradle, and the person looking for the device needs to be close enough to the lost device to hear the locator signal.

Object locating and tracking systems have been developed around technologies that use tags placed on the objects to be tracked and a scanner or reader to recognize the tags and to read information stored on the tags. These tags can either be active transmitting devices or passive devices. Examples of applications for these technologies include product inventory, grocery store checkouts, and package tracking. Each reader is generally a stand-alone, independent system capable of monitoring and obtaining information only on the objects that pass within its range. Generally, this range is very small, on the order of a few feet or less. In addition, the tags used in these systems are relatively expensive, making them suitable for expensive items but less suitable for inexpensive consumer items such as those purchased in a grocery store or discount store.

These types of tag and reader systems are illustrated, for example, in U.S. Pat. No. 3,859,624 that is directed to an inductively coupled transmitter and responder arrangement having a transmitter and a passive responder tag that receives all power from the AC power field inductively coupled thereto from the power field generator of the interrogator. The tag generates a code that is unique to the particular responder tag, and the code itself is generally a binary notation code. The interrogator receives the detected coded signal and generates an output signal which can be stored on magnetic tape for utilization in the computer, presented in a visual display, or transmitted elsewhere for subsequent utilization.

Similarly, U.S. Pat. No. 5,012,236 is directed to an electromagnetic energy transmission and detection apparatus which can simultaneously transmit a high intensity magnetic field and detect a localized low intensity magnetic field for greater distances between a reader and a passive identification tag. The reader includes a transmitter coil for transmitting a high intensity electromagnetic field to the passive identification tag and to receiver coils for receiving the low intensity electromagnetic field retransmitted by the passive identification tag to the reader. The passive identification tag includes a transponder which is capable of retransmitting a very low intensity electromagnetic field of a highly localized nature when exposed to an electromagnetic field transmitted by the transmitter coil of the reader.

U.S. Pat. No. 5,952,935 is directed to an improved programmable channel search reader that includes a field programmable serial port which may be linked to a computer by either hardware, radio frequency or the like to edit or enhance the software of the reader and if so programmed for external data logging and storage.

U.S. Pat. No. 6,184,777 discloses a passive integrated transponder tag interrogation system that is connected to a control unit that is connected to a computer through a data communication cable. The computer is a general purpose computer used to provide control to the unit, and the data communication cables include RS232 type DB 25 cables, EIA 485 metallic cables, and fiber optic cables. Wireless communication methodology utilizing digital or analog radio signals and infrared signals may also be deployed for the communication cable.

Applications for the use of reader and tag systems are illustrated, for example, in U.S. Pat. No. 3,732,465 that is directed to an electronic sensing and actuator system having a sensor and a key. The key includes interconnected passive electronic components including an electrical field sensitive circuit or circuits having a selected resident frequency or frequencies of a value within the range of frequencies of the oscillator and located in the sensor such that when the key is brought into a sensing zone, the energy of the variable frequency oscillator and the sensor is changed and that change is detected by the sensor. This apparatus has applications to door locks, and the key can also be attached to objects and used in a machine for purposes of counting or sorting objects carrying the key.

U.S. Pat. No. 3,752,960 is directed to a data acquisition system for electronically identifying and recognizing objects including systems for product handling, vehicle identification, locks and keys. The system is adapted to identify an object carrying an electrically passive circuit when the object is positioned within the effective coupling zone, but not necessarily touching, a sensor device of the active network. The passive object includes a passive reactive circuit adapted to resonate at a particular frequency when excited by the electromagnetic field of a sensor of the active part of the system.

U.S. Pat. No. 3,689,885 teaches an interrogator responder arrangement that is capable of handling random orientations between the interrogator and the responder for use in applications such as the tracking of guards, watchmen and executives in industrial plants wherein each person carries a small, inexpensive non-radiative passive responder. Interrogators are positioned at various fixed locations throughout the plant. In addition, this interrogator and passive responder arrangement could be used for the handling of luggage and cargo in airport terminals and freight terminals. In addition to a responder tag that is attached to each individual piece of luggage at the check-in station or at the ticket collection station at an airport terminal, a second responder tag having a code generation capability that provides the same code as the first responder, or bears a known correspondence to that one, is given to the passenger, and the passenger can insert the second tag into the baggage request station automatic handling equipment to detect the particular code on the tag and locate the passenger's luggage.

Other applications are directed to the use of tag and reader systems for the handling and tracking of livestock. U.S. Pat. No. 4,262,632 teaches an electronic livestock identification system containing a capsule or pill having an electronic transmitter which is uniquely coded to broadcast a series of electronic pulses from each animal in which it is internally implanted. An associated interrogator receiver unit, which is preferably situated externally of the animal, may be used for sensing and appropriately utilizing the electronic pulses to identify the animal. Although the capsule may include a power supply, it is preferably a passive storage element to which power may be induced from the interrogator.

International Application Number PCT/US87/00415 is directed to a syringe implantable identification transponder which is syringe implantable into an animal and provides identification of the specific animal when the transponder is interrogated. This transponder has particular application to the identification and monitoring of migratory waterfowl and other small animals such as fish.

Given the limitations and relatively high costs of these tracking and locating systems, an improved method for tracking and locating objects that is less expensive is desired. Suitable methods would permit a consumer to easily tag desired objects, to identify the importance of those objects, and to assign any necessary information related to those objects. In addition, it is desired to be able to track those objects across greater volumes of space and not to confine the locating and tracking of those items to fixed areas where scanners are located.

SUMMARY OF THE INVENTION

The present invention is directed to a system and method for providing a more deterministic method of locating lost items and of tracking objects. The system uses a plurality of smart monitors in combination with a plurality of passive tags that can be inductively coupled to the monitors to pass identification signals between the two. The monitors are also linked to a communication network, in particular a wireless peer-to-peer communication network, providing direct peer-to-peer communication across the network and access to one or more central databases that contain information related to the identification tags. Therefore, network coverages and capabilities are leveraged to provide for larger coverage areas to track and search for objects, to make searching quicker by communicating directly with other monitors, and to allow users of the system to initiate and control searches.

Tags are associated with objects, and the objects can be associated with an owner or with one or more monitors. In addition, rules to control the tracking and locating objects are provided for each object and are stored in a database for reference by one or more monitors. As objects that contain identification tags pass by monitors, the monitors receive signals from the identification tags and log the receipt of these signals and any information provided by the signal. Therefore, tracking of an object is accomplished by contacting one or more monitors and checking for receipt of a signal from a particular identification tag by the contacted monitors.

Alternatively, signal receipt and the information provided by the signal can be forwarded to and stored in the central databases accessible through the network. Any monitor having access to the network can then access a central database and look for any information about an identification tag and the object to which that tag is attached. In addition to general information about tags, objects, and owners, the database may contain a series of policies associated with each tag. These policies include protocols to be followed to search for particular tags including parameters for determining when an object is lost, a list of monitors to contact when searching for an object, and reporting requirements for lost objects.

DETAILED DESCRIPTION

The system and method of the present invention is used to locate objects that are lost or misplaced, to locate and recover items that are stolen or otherwise misappropriated, and to track important or sensitive items, livestock, and people.

Figure 1:
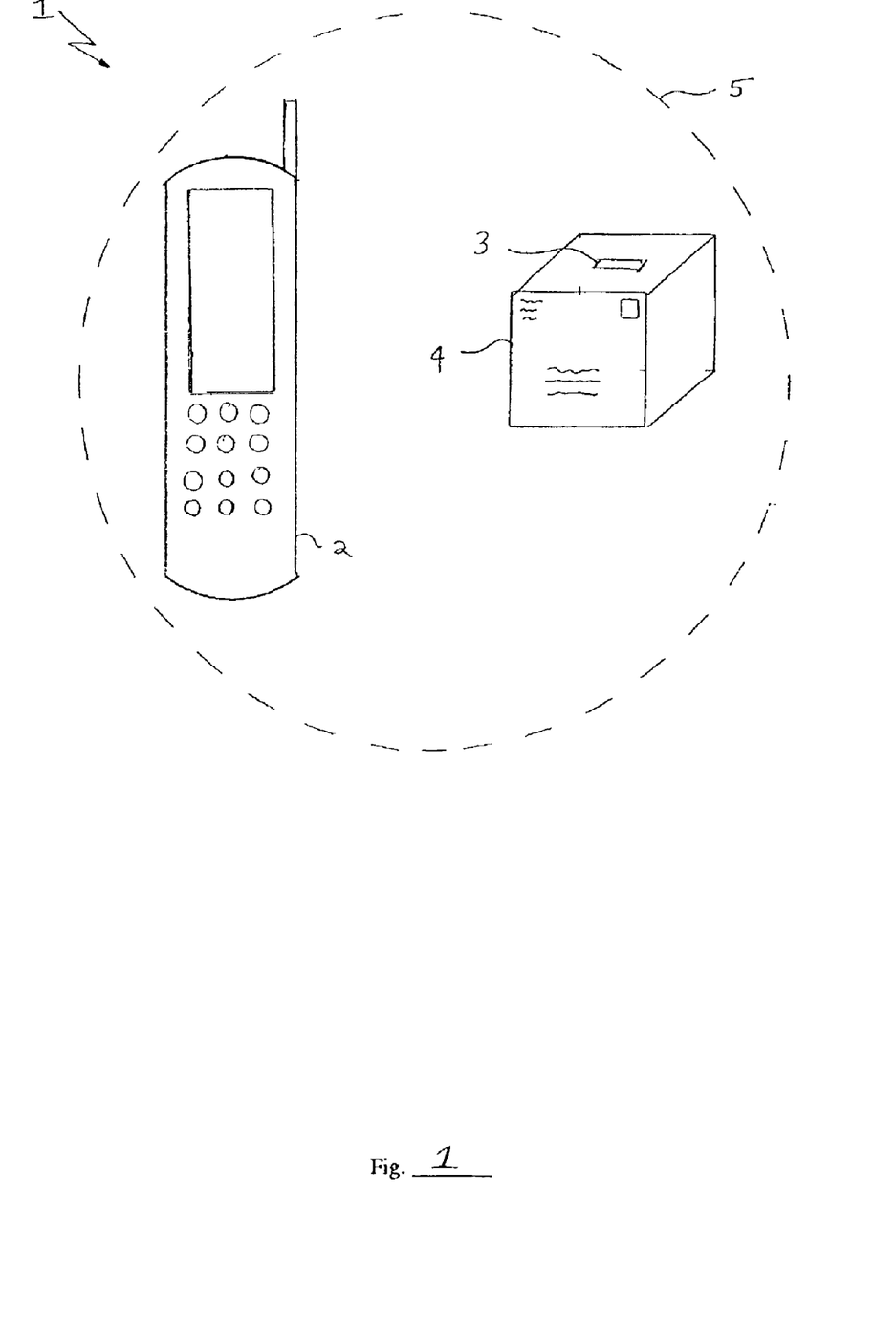
FIG. 1 is a schematic representation of an embodiment of a monitor and identification tag according to the present invention.

Referring initially to FIG. 1, the object monitoring and tracking system 1, of the present invention includes at least one monitor 2 capable of receiving a transmitted signal and at least one identification tag 3 capable of generating an identification signal. The identification tag is attached to the object 4 to be monitored or tracked. The identification tag 3 transmits the generated identification signal within a transmission volume 5. The monitor 2 receives the identification signal that is emitted from the identification tag 3 while it is disposed within the transmission volume 5. Various arrangements of monitors and identification tags are readily available and known to those of skill in the art and are suitable for use in the object monitoring and tracking system of the present invention.

In general, the monitor 2 includes the electronics and circuitry necessary to receive the identification signal. This circuitry includes a receiver for receiving the identification signal, a logical processor connected to and in communication with the receiver, and a power supply electrically coupled to all of the electronic components and circuitry of the monitor to provide power thereto. Suitable frequencies for the receiver include radio frequencies, and suitable logical processors can receive and interpret the identification signal to identify the object to which the identification tag is attached.

In one embodiment of the present invention, the identification tag 3 generates the identification signal in response to receipt of a signal generated and transmitted by the monitor. In this embodiment, the monitor also includes a transmitter. Suitable transmitters include radio frequency transmitters. Preferably, the object monitoring and tracking system includes a plurality of monitors that are each capable of transmitting a radio frequency signal and of receiving the identification signal transmitted by the identification tag. Each monitor may also include a memory for storing the received identification signals.

The monitors 2 are preferably incorporated into other electronic devices. Suitable electronic devices include cellular phones, wire line phones, pagers, personal digital assistants, computers, alarms or other general monitoring systems, electronic watches, stereos, televisions, video cameras, smoke alarms, cameras, radar equipment, and photo-copiers. These electronic devices are selected and deployed as monitors to create both a plurality of stationary monitors and a plurality of mobile monitors. The stationary monitors are associated with a known fixed location such as a physical street address. The mobile monitors are associated with moving or non-stationary items such as a person, animal, automobile, airplane, boat, robot, satellite and combinations thereof.

Figure 2:
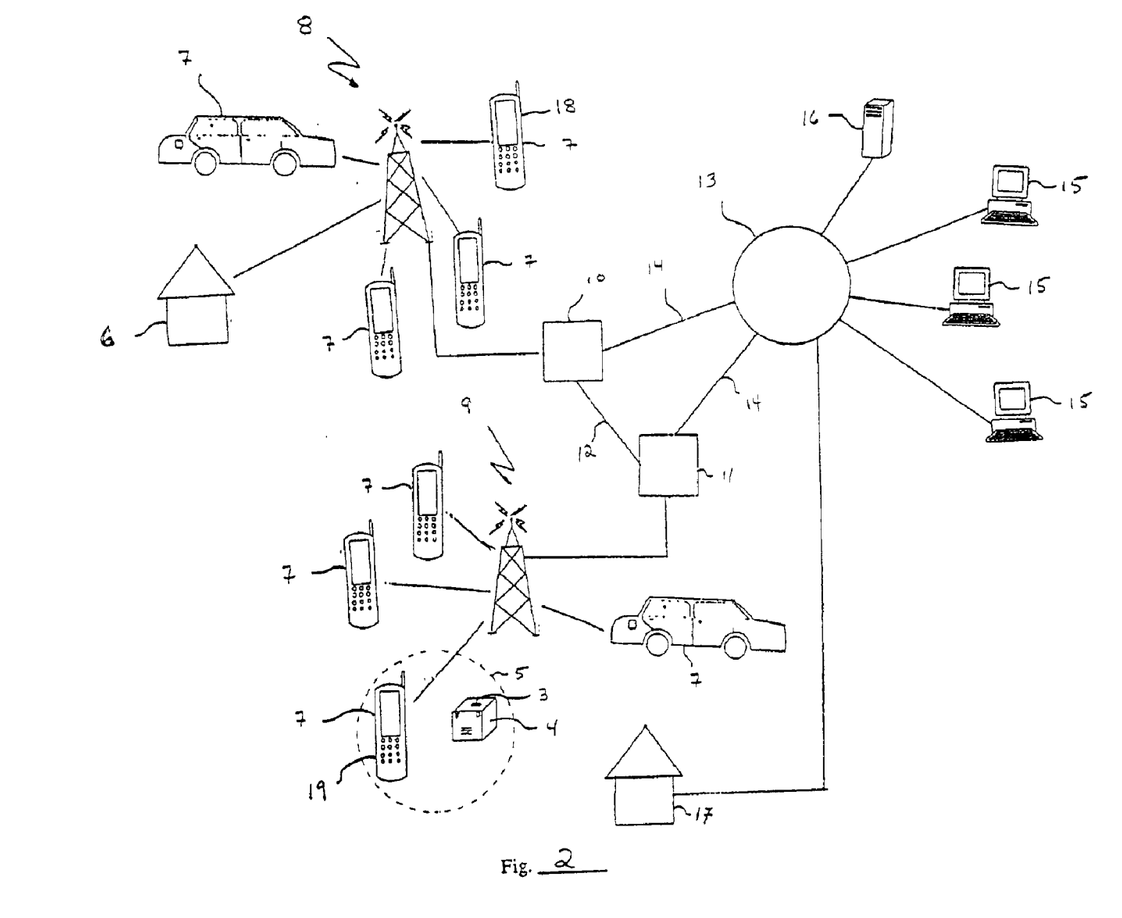
FIG. 2 is a schematic representation of an embodiment of the network tracking and monitoring system of the present invention.

As is shown in FIG. 2, in order to expand and to maximize the area or volume covered by the object monitoring and tracking system of the present invention, the monitors are in communication with at least one network. Preferably, the monitors are in communication with a plurality of networks. Any network capable of permitting communication among the monitors is suitable for use with the present invention including wireline and wireless networks. In one embodiment, the network is a wireless type network. In another embodiment, the network is a peer-to-peer type network.

As illustrated, a plurality of stationary monitors 6 and a plurality of mobile monitors 7 are associated with a first wireless peer-to-peer network 8 and a second wireless peer-to-peer network 9 respectively. These wireless networks can be associated with one or more telephone networks such as an Advance Intelligent Network. In one embodiment, the first wireless network 8 is associated with a first telephone network 10, and the second wireless peer-to-peer network 9 is associated with a second telephone network 11. The first and second telephone networks can be in communication through a direct data link 12. Preferably, the telephone networks are linked to one or more computer networks 13, either local area networks or a wide area network such as the Internet, through separate network interface data lines 14. All of the computer networks are in communication with each other, and any monitor can communicate directly with any other monitor across these networks. In addition, the computer network 13 includes a plurality of additional computers 15, and may also include either stationary or mobile monitors 17 directly linked thereto.

The object monitoring and tracking system also utilizes one or more databases 16. Although these databases 16 can be in direct communication with the wireless networks or telephone networks, the databases 16 are preferably associated with the computer network 13. The databases 16 are used to store information about the identification tags, the objects to which the identification tags are attached, and the owners of these objects. This information includes an association between a specific identification tag and the object to which that tag is attached and profile information about the registered owner of that object. Also included in this information is a physical description of the object, the purchase price of the object, the date of purchase of the object, the current value of the object, the date of manufacture of the object, and the expiration date of the object if applicable. Input of this information by the owner is facilitated through the computer network 13. The information can be input using any computer 15 in communication with the network 13. Alternatively, an owner can upload the necessary information using either any stationary monitor 6 or any mobile monitor 7 that is in communication with the computer network 15.

The monitors may be passive devices that record the identification signals of any and all objects carrying identification tags that pass close enough so that the monitor falls within the transmission volume of that transmission tag. Alternatively, the monitors are actually active devices that proactively search for specific identification tags. The monitors may also include monitor identification tags that are similar to the object identification tags and that permit each monitor to track or to log the other stationary and mobile monitors over time in which it comes into contact.

The system and method of the present invention leverage existing peer-to-peer communication networks such as peer-to-peer wireless telephone networks to create a more expansive area for tracking objects. In order to leverage these network capacities, each monitor provides the information that it receives to the network for storage in the database. The other monitors can then query the database regarding specific information signals. In addition, a customer can log on to the computer network and report an object missing. The network will check the database for occurrences of the associated identification tags and monitors and will conduct a systematic search for that particular object by checking with the appropriate monitors. Monitors may also contact each other directly across the peer-to-peer network. As illustrated in FIG. 2, a first monitor 18 may contact a second monitor 19 to see if a particular object 4 has been tracked by the second monitor 19. Therefore, a customer can use one monitor in the peer-to-peer network to track a particular object throughout the network using other monitors in the network directly.

The tracking information received by the monitors can be uploaded continuously to the database or can be uploaded only when a particular monitor accesses the network. In one embodiment, information about a tracked identification tag can be broadcast across the network to see if any monitors are receptive to or searching for that identification signal. If no other monitors are currently looking for that tag information, then the information is directed to the database to wait for a request for that particular identification tag. The present invention also makes use of interspersed peer-to-peer wireless communication networks to provide increased coverage for searching and tracking within an area.

The identification tags are preferably passive devices having no power supplies or internal smarts, instead receiving energy from the monitor through methods such as inductive coupling. In order to facilitate inductive coupling with the monitors, each identification tag includes electronic circuitry, such as an induction coil. Suitable electronic circuits for coupling to the monitors and for emission of an identification signal upon exposure to a radio frequency signal are known in the art. Upon inductive coupling, each identification tag generates and transmits its unique identification signal within the transmission volume. The transmission volume can extend from the identification tag for distances of from less than a foot up to approximately several hundred feet. For security purposes, the identification signal is preferably a unique alpha-numeric code.

Figure 3:
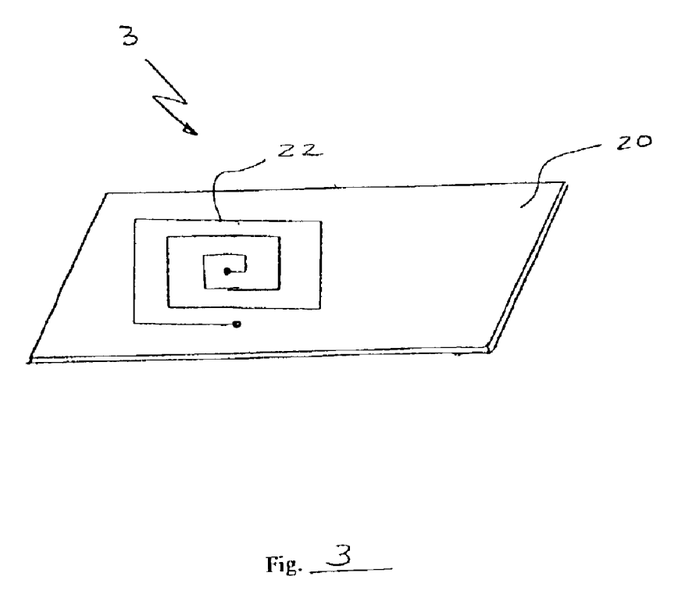
FIG. 3 is a perspective view of a first side of an identification tag of the present invention.
Figure 4:
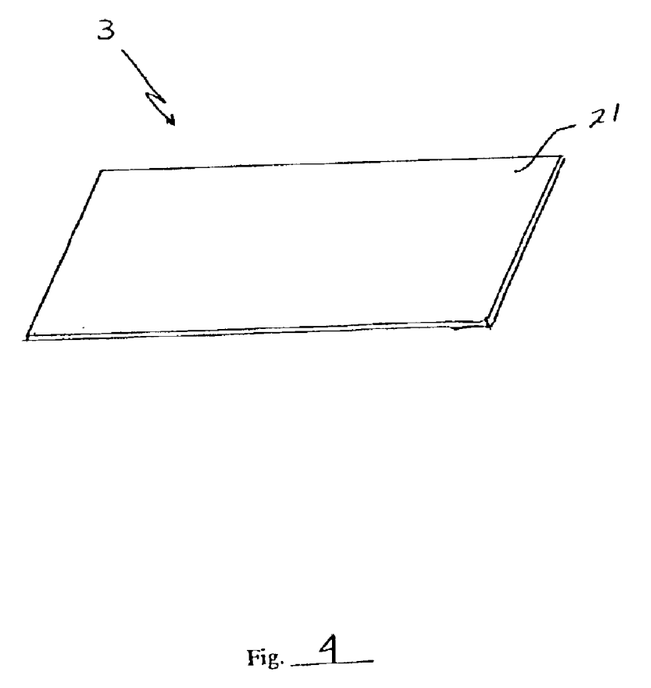
FIG. 4 is a perspective view of a second side thereof.

The identification tags are arranged to be easily attachable to objects and include fasteners or adhesives to facilitate the attachment. Suitable adhesives include glues and hook and loop type fasteners, in one embodiment, the tracking tags are removable and reattachable. The identification tags can be fashioned in any desired shape and can even be constructed to be part of the object to which they are attached. Preferably the tracking tags are constructed to be inexpensive and are provided so that a person may purchase multiple identification tags for placement onto the objects to be tracked. In one embodiment, as shown in FIGS. 3 and 4, the identification tag is made out of a sheet of material having a first side 20 and a second side 21 opposite the first side 20. The first side 20 contains the electronic circuitry 22 capable of generating the identification signal and of transmitting that signal within the transmission volume. Preferably, the electronic circuitry is printed on the first side of the identification tag by a dot-matrix type printing process. In one embodiment the dot-matrix type printing process is an inkjet type process. The second side opposite the first side contains an adhesive for attachment to the object. The first side of the identification tag, in addition to containing the electronic circuitry, may be blank or may contain printing such as a UPC, product information, advertisements or combinations thereof. Alternatively the identification tag can include camouflaging or other markings so that the identification tag will blend with the background of the object to which it is attached.

Figure 5:
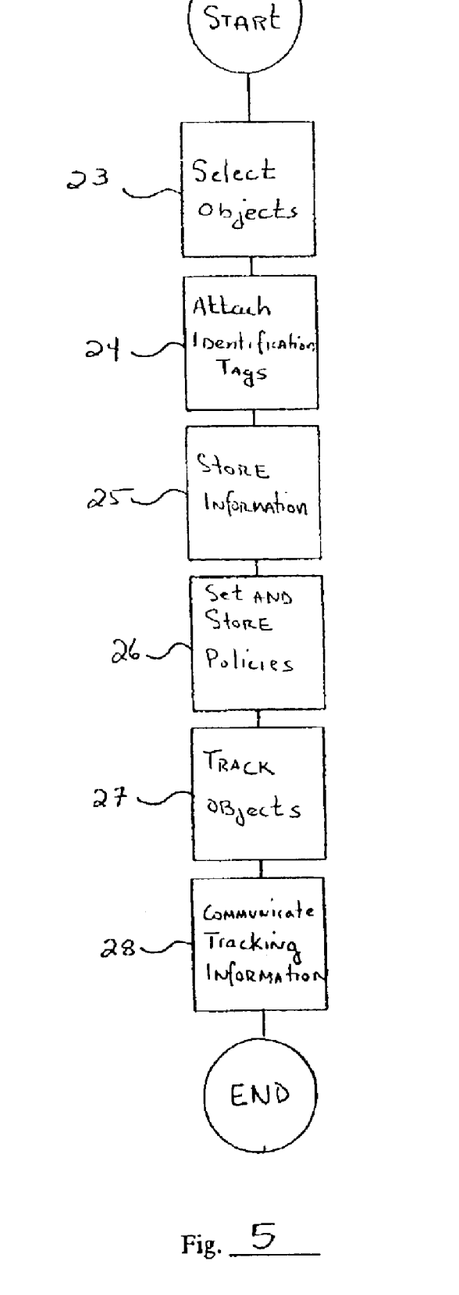
FIG. 5 is a flowchart illustrating an embodiment of the monitoring and tracking method of the present invention.

Referring to FIG. 5, in order to use the tracking system in the method of the present invention, an owner, or any other person having a need or desire to monitor or track an object, selects an object to be monitored or tracked 23. Alternatively, the owner selects a plurality of objects to monitored or tracked. The owner than places an identification tag on each selected object 24. In one embodiment, the identification tags come in pre-printed self-adhesive sheets. The identification tags are placed on the objects using the adhesive.

Since the unique identification signal transmitted by each tag is a random alpha-numeric code, correspondence is needed between the identification tag and the object to which it is attached. In addition, this correspondence information may be needed by more than one monitor. Therefore, the owner of the object, using either a monitor connected to the peer-to-peer network or a computer connected to the computer network, stores the correspondence information in the database using conventional methods of network and computer interfaces and data loading 25. The owner can also store any other information about the object in the database.

In addition to storing information about the object the owner can store in the database policies regarding the rules used by the network and the monitors on the network in tracking and reporting the tracking information of each object 26. These policies include the identification of categorization of a general category into which an object is placed, for example, package, jewelry, animal, or food, and the definition of when an object bearing the identification tag is lost such as when the tag is not within the range of a particular monitor or monitors. The policies also include instructions for routine tracking of the object such as making routine communications and data transfers from specific monitors or sweeping specified volumes covered by monitors. The owner can also store instructions for reporting that an object is lost, for example, by phone or e-mail, and instructions on what actions to take should an item become lost. One such policy could instruct monitors to automatically look for an object if it should be determined that the object is lost. An alternative policy would notify a customer when an object is lost and wait for instructions before searching.

In one embodiment, the policies contain protocols for searching for a lost object including where to search first, which monitors to search, and which monitors not to search. Specifically, in one example, a monitor is contacted to see if it has come into contact with the corresponding identification tag and at what time it came into contact with that tag. That monitor also provides information about other monitors with which it has been in contact. This provides for expanding or extending the tracking objects to other monitors. A continuous or real time tracking of objects is thus facilitated by contacting a succession of monitors.

Policies can be stored that place limits on the monitors that can track an object. In one embodiment, the policies identify monitors or volumes within which an item will function or volumes and monitors within which an item will self destruct. In an embodiment for inventory and restocking, a policy can be provided to report when a particular object is out of stock or of a low amount so that restocking or purchasing of that item can take place. In another embodiment, an owner can register personal information such as allergies and the customer will be notified when that customer is close to an object to which the customer is allergic or when the customer purchases an object that contains ingredients to which the customer is allergic. Any one or multiple combinations of these policies can be provided in the database for each selected object.

Once the necessary information and desired policies have been stored in the database, the objects to which the identification tags are attached are monitored or tracked 27 in accordance with the stored policies. The monitors can track the objects passively by logging a list of all the identification signals received. Alternatively, the network in accordance with a stored policy or in response to a search request from an owner can systematically check monitors across the network for a particular object. In a peer-to-peer type network, a first monitor can contact a second monitor to check for a particular object. The identification signals received by each monitor, to further leverage the capacity of the network, are communicated to the network 28.

In one embodiment, each monitor continuously passes the received identification signals through the network for storage in the network accessible databases. In addition to just the signals, information about where, when, and by which monitor the signal was tracked is also stored. In an alternative embodiment, each monitor uploads the information signals every time the monitor accesses or is accessed by the network, such as when a cellular phone places or receives a call. In one embodiment, each monitor broadcasts the identification signals to all the other monitors and computers in the network before storing the signals in the database.

Examples for applications of the system and method of the present invention include applying identification tags to personal property, in particular, personal property that is lost regularly including keys, glasses, pagers, watches, cameras and video cameras. Another application includes tracking packages by a shipping company. The low cost and ease of use of the present system also permit a customer to track mail by applying to envelopes and packages stamps that have the electronic circuitry printed on them. This provides a relatively inexpensive and easy way for a customer to track a letter sent, for example, through the United States Postal Service that was previously extremely difficult to impossible to track. Monitors would be provided in mailboxes and throughout the postal distribution system. This also would be particularly useful as an anti-terrorist mechanism providing greater tracking of mail for the purposes of identifying the source of a package containing bombs or other hazardous materials.

Another application for the system and method of the present invention includes maintaining and monitoring files in an office. Similarly, the method and system of the present invention can be used to maintain and monitor library books within a library and throughout the borrowing area. The method and system of the present invention can be used to monitor prison inmates within a prison population, on work-release or on home detention. The present invention provides for the tracking of wild animals, farm animals and zoo animals. With respect to the monitoring of animals, the method and system of the present invention could be combined with a tranquilizer dosing system so that if the animal is not within a prescribed area, the tranquilizers are dosed into the system of the animal and the animal can be subdued.

The method and system of the present invention could be used to tag items in a house for insurance purposes in the case of theft or fire, providing the benefit of lowering insurance rates and managing assets by permitting the owner of tagged property to easily check to see if current insurance rates will cover current value of all the goods in the house. The method and system of the present invention can be used to tag items to prevent theft out of a rental property or hotel and also to track any property that has been taken from those properties.

The method and system of the present invention can be used to provide for the activation or deactivation of an object. For example, a policy can be stored that provides that an object will only function when it is in proximity to a specific monitor. The method and system of the present invention can be used in an amusement park, a museum, a ballpark or stadium. In this application tags are sold to visitors as they enter the facility, and the visitor places the identification tags on important items such as cameras and video recorders. The identification tags can also be fashioned as armbands to be placed on all the family members, in particular the children. The visitors would provide the information and policies that are uploaded, specifically to a database attached to a local area network for the facility. Fixed monitors are provided throughout the facility. In addition, wireless devices that the parties carry with them can be incorporated in as mobile monitors. For example, any wireless device capable of transmitting and/or receiving an electromagnetic signal (e.g. a cellular phone, a satellite phone, a personal digital assistant, an interactive pager, and others) may be programmed into the monitoring and tracking network such that the wireless device is incorporated into the network as a temporary, mobile monitor that can transmit a search signal to locate an object within a proximate transmission volume, receive an identification signal from any identification tag within a proximate transmission volume, and/or communicate with other monitors and/or the tracking and monitoring network. The facility can also have maps so that if a party stands close to the map, the location of all the other persons and property associated with that party will show up on the map to provide an easy and quick way of locating family members and property that may become dispersed throughout the facility during the course of a day. The method and system of the present invention can also be used to monitor and track family members at home, in particular school aged children, so that a parent can be notified when a child leaves the house, leaves the yard, leaves school, leaves a friends yard, enters a pool deck or arrives home from school.

While the present invention has been described and illustrated herein with respect to the preferred embodiments, it should be apparent that various modifications, adaptations, and variations may be made utilizing the teachings of the present disclosure without departing from the scope of the present invention and are intended to be within the scope of the present invention.

What is claimed is:

1. A method for tracking an object, the method comprising the steps of:

selecting at least one object to be tracked;

placing an identification tag on the object, the identification tag capable of generating an identification signal and of transmitting that signal within a transmission volume;

tracking the object using a plurality of monitors that are capable of receiving the identification signal while disposed within the transmission volume, each monitor in communication with a network;

communicating tracking information about the object across the network;

storing information about the identification signal in a database that is accessible across the network, wherein the information comprises an association between the identification signal for the identification tag and the object to which the identification tag is attached, a description of the object, a purchase price for the object, a purchase date for the object, a value for the object, a date of manufacture, an expiration date, a profile of a registered owner for the object, or combinations thereof; and storing policies regarding the tracking of the identification tag in the database.

2. A method for tracking an object, the method comprising the steps of:

selecting at least one object to be tracked;

placing an identification tag on the object, the identification tag capable of generating an identification signal and of transmitting that signal within a transmission volume;

tracking the object using a plurality of monitors that are capable of receiving the identification signal while disposed within the transmission volume, each monitor in communication with a network;

communicating tracking information about the object across the network;

storing information about the identification signal in a database that is accessible across the network, wherein the information comprises an association between the identification signal for the identification tag and the object to which the identification tag is attached, a description of the object, a purchase price for the object, a purchase date for the object, a value for the object, a date of manufacture, an expiration date, a profile of a registered owner for the object, or combinations thereof; and storing policies reguarding the tracking of the identification tag in the database, wherein the policies comprise instructions for routine tracking of the object, conditions under which the object is lost, instructions for reporting the object as lost, protocols to search for the lost object, categorizations of the object, definitions of permissible areas for the object, instructions regarding the inventory and stocking of the object, or combinations thereof.

3. A method for tracking an object, the method comprising:

selecting at least one object to be tracked;

placing an identification tag on the object, the identification tag capable of generating an identification signal and of transmitting that signal within a transmission volume;

storing policies regarding the tracking of the object in a database that is accessible across a network; and tracking the object in accordance with the stored policies using a plurality of monitors that are capable of receiving the identification signal while disposed within the transmission volume, each monitor in communication with the network.

4. The method of claim 3, wherein the network is a wireless, peer-to-peer network.

5. The method of claim 3, wherein the policies comprise instructions for routine tracking of the object, conditions under which the object is lost, instructions for reporting the object as lost, protocols to search for the lost object, definitions of permissible areas for the object, instructions regarding the inventory and stocking of the object, or combinations thereof.

6. The method of claim 3, further comprising communicating tracking information about the object among at least two monitors across the network.

7. The method of claim 3, further comprising continuously uploading tracking information about the object to the network.

8. The method of claim 7, further comprising broadcasting the uploaded tracking information across the network.

9. The method of claim 3, further comprising:

selecting a plurality of objects to be tracked; and placing a unique, distinctive identification tag on each selected object.

* * * * *